United States Patent Office 3,631,225
Patented Dec. 28, 1971

3,631,225
PREPARATION OF POLYVINYL ACETALS
Linwood P. Tenney, Durham, N.C., and Robert D. Lundberg, Somerville, N.J., assignors to Union Carbide Corporation, New York, N.Y.
No Drawing. Filed Apr. 28, 1970, Ser. No. 32,717
Int. Cl. C08f 29/50
U.S. Cl. 260—874
10 Claims

ABSTRACT OF THE DISCLOSURE

The preparation of polyvinyl acetals having a vinyl ester content of about 12 to 25% and a polyvinyl alcohol content of about 7 to 10% was achieved in non-aqueous dispersions by the addition of a swelling agent. The swelling agent is preferably an alkylene glycol alkyl ether, such as 1,2-dimethoxyethane although diethylene glycol alkyl ethers, dioxane, tetrahydrofuran, or tetrahydrothiophene can also be used.

BACKGROUND OF THE INVENTION

This invention relates to the preparation of poly(vinyl acetals) from non-aqueous dispersions of polyvinyl esters. More particularly this invention relates to the transformation of polyvinyl esters to poly(vinyl acetals) in the presence of a swelling agent.

Polyvinyl acetals have been prepared from polyvinyl esters and particularly from polyvinyl acetates either by a one-step process involving simultaneous saponification of the polyvinyl ester and acetal formation or by a two-step process involving the alcoholysis of the polyvinyl ester as the initial step and as the second step the condensation of the polyvinyl alcohol thus formed with an aromatic or aliphatic aldehyde. This technology is described in Vinyl and Related Polymers by C. E. Schildknecht, John Wiley and Sons, New York, N.Y., 1952 (pages 358 to 360).

The one-step preparation of polyvinyl acetal for the most part has been conducted as a solution process in organic solvents. Recently this one-step method has also been effected in non-aqueous dispersion systems which permits the handling of higher solids content reaction mixtures since the viscosities of comparable non-aqueous dispersions are lower than equivalent concentrations in a solution.

The properties of polyvinyl acetals are determined among other things by the amount of unsaponified vinyl ester, vinyl alcohol, and acetal moieties contained in the total polymer. Thus, for example, in the preparation of safety glass, a polyvinyl butyral is used having a small amount of vinyl acetate, about 18 to 19 percent vinyl alcohol groups and about 70 to 80 percent of vinyl butyral groups. Polyvinyl butyral resins used in wash primers call for polyvinyl butyrals having about 2 to 3 percent residual vinyl acetate. Other applications, as for example, specialty adhesives, textile coatings, strippable coatings and the like, call for still different compositional variations where the vinyl acetate content is much higher than that afforded by previously known methods, that is compositions having about 12 to 25% vinyl acetate with the polyvinyl alcohol content being about 7 to 10%. It is therefor important to provide a method for preparing polyvinyl acetals of such compositions cheaply and consistently.

SUMMARY OF THE INVENTION

A suitable method has now been found for preparing polyvinyl caetals having vinyl ester contents of about 12 to 25% and polyvinyl alcohol contents of about 7 to 10%, which consists essentially of:

(a) Heating with agitation at temperatures of about 0° C. to 150° C. for at least 5 minutes a mixture of:

(1) a vinyl ester, having from 3 to 20 carbon atoms, and an inert hydrocarbon diluent, said vinyl ester being present in a concentration of about 5 to 85 percent by weight, (2) about 0.1 to 10 percent, based on the weight of said vinyl ester, of a polymeric organic interfacial agent selected from the group consisting of α-olefin/vinyl ester copolymers, vinyl acetate graft copolymerized onto ethylene/vinyl acetate copolymer, alkyl polyvinyl ethers, propylene oxide rubbers, or ethylene-propylene terpolymers, and (3) about 0.01 to 1 percent, based on the weight of said vinyl ester of a free radical polymerization initiator;

(b) Recovering normally solid polyvinyl ester as a non-aqueous dispersion having a particle size of about 0.05 to 50 microns and an outer coating of polymeric organic interfacial agent;

(c) Contacting said polyvinyl ester dispersion with;

(1) about 0.8 to 1.5 moles, per mole of polyvinyl ester, of an aliphatic alcohol having from 1 to 6 carbon atoms, (2) about 0.35 to about 0.75 mole, per mole of polymerized vinyl ester, of an aliphatic aldehyde having from about 1 to 6 carbon atoms, (3) a catalytic amount of an acid catalyst, (4) about 2 to 8 percent, based on the total charge weight, of a swelling agent selected from the group consisting of alkylene glycol alkyl ethers having the formula ROR'OR wherein R is alkyl having 1 to 6 carbon atoms and R' is alkylene having 2 to 4 carbon atoms, diethylene glycol alkyl ethers having the formula $ROCH_2CH_2OCH_2CH_2OR$ wherein R is as defined above, dioxane, tetrahydrofuran and tetrahydrothiophene; for at least 60 minutes at a temperature of about 25° C. to 150° C. and a pressure of about 0 to 200 p.s.i.g., and, (d) Recovering said polyvinyl acetal dispersion.

DESCRIPTION OF THE PREFERRED EMBODIMENTS

The preferred polymerized vinyl ester used in this invention is polyvinyl acetate, although other esters such as polyvinyl formate, polyvinyl propionate, polyvinyl butyrate, and the like having up to 20 carbon atoms can be used if desired.

Although the average particle size of the polymerized vinyl ester used in the dispersions of this invention range from about 0.05 to 50 microns, it is preferred to use particles in the range of about 0.1 to 5 microns and it is particularly preferred to use particle sizes in the range of about 0.1 to 1 micron.

The preferred inert hydrocarbon diluents are aliphatic or cycloaliphatic hydrocarbons having from about 5 to 12 carbon atoms therein. Exemplary of the aliphatic hydrocarbons are pentane, isopentane, n-hexane, isooctane, and the like. Exemplary cycloaliphatic hydrocarbons are cyclopentane, cyclohexane, methylcyclohexane and the like.

The preferred α-olefin-vinyl ester copolymer is an ethylene/vinyl acetate copolymer or a graft of vinyl acetate polymerized onto an ethylene/vinyl acetate copolymer. These ethylene-vinyl acetate copolymers and graft copolymers preferably contain from about 5 to 80 percent vinyl acetate copolymerized therein with 28 to 50 percent vinyl acetate being particularly preferred.

The preferred alkyl vinyl ether polymer is polyvinyl ethyl ether, although others such as polyvinyl isobutyl ether, polyvinyl propyl ether and the like and can also be used.

The concentration of interfacial agents should be at least 0.1 percent based on the weight of the dispersed polyvinyl acetate. It is preferred to use at least 0.2 percent up to about 10 percent.

Any conventional free radical polymerization initiator known in the art may be used for the preparation of the non-aqueous dispersions of polyvinyl ester including organic peroxides such as, benzoyl peroxide, lauryl peroxide, caprylol peroxide, diacetyl peroxide; azo catalysts such as, azobisisobutyronitrile; and dialkyl peroxy dicarbonates, such as diisopropyl peroxy dicarbonate and the like. Although initiator concentrations in the range of about 0.01 to 1 percent, based on the weight of vinyl esters can be used, about 0.06 to 0.2 is preferred.

Reaction temperatures for the polymerization of the vinyl esters can range from 0 to 150° C. although a range of about 25 to 125° C. is preferred at a temperature of about 50 to 100° C. is particularly preferred.

The preferred alcohols used for the preparation of the polyvinyl acetals are methanol, ethanol, and butanol. The upper limit of the alcohol concentration is critical and should be about 1.5 moles, per mole of polyvinyl ester, since agglomeration occurs above this limit.

The preferred aldehydes are formaldehyde, acetaldehyde and butyraldehyde. It is important that the concentration of aliphatic aldehyde be about 0.35 to 0.75 mole of aldehyde per mole of polyvinyl ester. The use of concentrations above about 0.75 mole of aldehyde causes over-solvation of the dispersion particles resulting in collapse of the dispersion and agglomeration of the reaction mixture. The use of concentrations below 0.35 mole of aldehyde results in insufficient acetal formation in the resulting product along with diminished reaction rates.

The preferred acid catalysts used for the preparation of the polyvinyl acetals are mineral acids of which hydrochloric, sulfuric, phosphoric, and perchloric acids are particularly preferred although organic acids such as acetic, trifluoracetic, aryl sulfonic acids and the like can also be used if desired.

The concentration of acid used for the preparation of the polyvinyl acetals is literally catalytic and can vary from about 0.001 to 5.0 percent or higher based on the weight of polyvinyl ester charged.

The preferred swelling agents are alkylene glycol alkyl ethers of which 1,2-dimethoxy methane is particularly preferred. Other swelling agents which can be used include diethylene glycol alkyl ethers.

If desired, cyclic ethers can also be used as swelling agents as for example, dioxane, tetrahydrofuran, tetrahydrothiopene, and the like.

While it is understood that this invention is not limited to any particular mechanism, theory or explanation, it is believed that the swelling agents enumerated supra afford polyvinyl acetals having a different composition and different physical properties from those obtained through prior art methods by altering the relative reaction rate ratios involved in converting polyvinyl ester to polyvinyl acetal. It is further postulated that the swollen polyvinyl ester particles present different targets for attack by such reagents as aliphatic alcohol and aliphatic aldehyde from those which are unswollen. Some of the important reactions occurring in the conversion of polyvinyl acetate to polyvinyl butyral outlined above are delineated below.

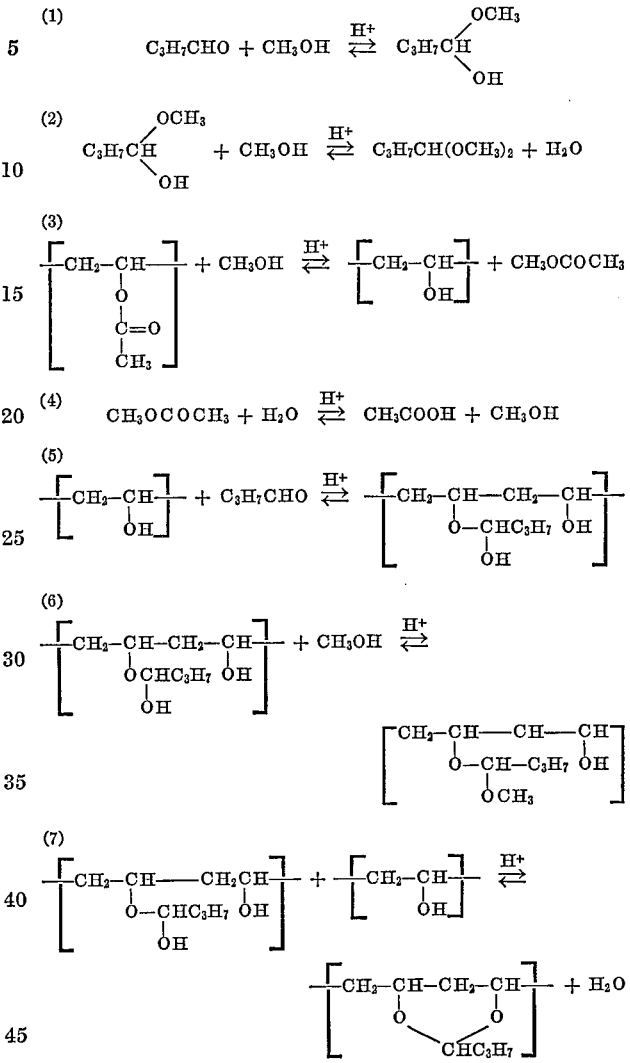

The concentration of swelling agent is critical in the practice of his invention. Below the lower limit of about 2 percent, based on the total charge weight, no appreciable effect was obtained. Above the upper limit of about 8 percent, agglomeration of the non-aqueous dispersion takes place vitiating any desirable effects. The preferred range is about 3 to 7 percent by weight of swelling agent with 4 to 6 percent being particularly preferred.

The preferred temperature for the preparation of the polyvinyl acetals from the polyvinyl ester dispersions is about 50 to 100° C., with a range of 70 to 90° C. being particularly preferred.

The pressure used for the preparation of the polyvinyl acetals depends on the boiling point of the hydrocarbon diluent and aliphatic alcohols used. Thus in order to achieve the preferred temperature for the acetal reaction with lower boiling hydrocarbon diluents and/or alcohols some superatmospheric pressure is required. For economic reasons it is preferred to operate as close as possible to atmospheric pressure.

The invention is further described in the examples which follow. All percentager are by weight unless otherwise specified.

Example 1

A non-aqueous dispersion of polyvinyl acetate was prepared by charging a 4-neck 1 liter resin kettle equipped with a stirrer, reflux condenser, thermometer, and nitrogen gas inlet tube with 240 grams (60 percent by weight) of vinyl acetate, 160 grams (40 percent by weight) of cyclohexane and 1.4007 grams (0.6 percent by weight based on the weight of vinyl acetate monomer) of an ethylene-vinyl acetate copolymer containing 28 percent vinyl acetate polymerized therein and having a melt index of 23.8 dg./min. The resin kettle was heated to 70° C. until the ethylene-vinyl acetate copolymer dissolved in the diluent. Then 0.1514 gram of benzoyl peroxide was added to the resin kettle with stirring. Within an hour a slight haze developed which after 1.5 hours became a milky dispersion. Polymerization was continued for a total of 22 hours. The solids level of the polyvinyl acetate dispersion produced was 58 percent. The inherent viscosity of solid polyvinyl acetate when measured as a 0.2 solution in cyclohexane at 30° C. was about 0.45. The particle size of the dispersed polyvinyl acetate was in the range of 0.3 to 5 microns. Additional runs were made to provide a stock for the poly(vinyl acetal) preparations of this invention.

300 grams of the polyvinyl acetate dispersion prepared as described above and having a solids content of 63 percent in n-hexane was charged to a 2-liter resin kettle equipped with a mechanical stirrer, gas inlet tube, thermometer well and pressure gauge equipped with a safety valve together with 105.1 grams of anhydrous methanol, 150 grams of n-hexane, 8.6 grams (4 mole percent) of concentrated hydrochloric acid, and 32 grams, (5 percent of the total weight of component) of 1,2-dimethoxy ethane. The mixture was stirred and then 68.5 grams of n-butyraldehyde was added to the mixture and the kettle sealed. The reaction vessel was heated to 80° C. at a pressure of about 20 p.s.i. Internal and external temperatures were monitored by thermocouples connected to a Leed-Northrup Speedomax Multi-Channel Recorder. After about 7 hours reaction time the reaction vessel was cooled, opened and the acid neutralized with 8 grams of propylene oxide. The product removed was a stable, non-aqueous dispersion of polyvinyl butyral with an indefinite shelf life. The solid poly(vinyl butyral) was isolated by basket centrifugation and the solid product dried for 2 days in a vacuum oven at 33° C. This product had the consistency of a fine powder. Analysis of this product indicated a polyvinyl acetate content of 19.98 percent by weight and a polyvinyl alcohol content of 9.43 percent by weight.

This product afforded a clear, sparkling solution with a 60:40 (weight:weight) of a toluene-ethanol mixture indicating the absence of gels or insoluble cross-linked polymer.

The physical properties of films cast from the non-aqueous dispersion of the poly(vinyl butyral) thus prepared are shown in the table below:

TABLE I

| | |
|---|---|
| Modulus, p.s.i. (ASTM D790–61T) | 192,000 |
| Yield, strength, p.s.i. (ASTM D790–61T) | 4,230 |
| Tensile strength, p.s.i. (ASTM D790–61T) | 4,320 |
| Yield elongation, percent (ASTM D790–61T) | 3 |
| Elongation at break, percent (ASTM D790–61T) | 22 |
| Pendulum impact strength (ft. lbs./in.$^3$) (ASTM D256–56) | 2.5 |
| Glass transition temperature, °C. | 50 |
| Flow temperature, °C.[1] | 160 |

[1] Subjective test made by visually observing temperature at which flow begins.

The advantages of this poly(vinyl butyral) over a commercially available polyvinyl butyral Control A having a polyvinyl acetate content of about 2.5% and a polyvinyl alcohol content of about 9.5% was demonstrated by adhesion data obtained by measuring "T" peel strengths modified ASTM Method D1876–61T) of films pressed on Q steel panels meeting ASTM D–609 Type A specifications. The laminates were prepared by bonding sheets of each of Example 1 product and the Control A in a press at 200° C. for a few minutes under a pressure of 10,000 p.s.i. The average of two samples of each of the specimens was taken with a crosshead speed of 2″ per minute using an Onstron Tensile Tester for effecting peel. The Example 1 material gave a peel strength of 14.5 pounds per linear inch as compared with a peel strength of 6.4 pounds per linear inch for Control A.

Example 2

Example 1 was repeated with the exception that 2.5 percent of 1,2-dimethoxy ethane was used instead of 5 percent. Again a non-aqueous dispersion of poly(vinyl butyral) was obtained. The composition of this product was 0.2 percent polyvinyl alcohol, 12 percent polyvinyl acetate and 78 percent polyvinyl butyral. The physical properties of this product are shown in the table below.

TABLE II

| | |
|---|---|
| Modulus, p.s.i. | 192,000 |
| Yield, strength, p.s.i. | 4,230 |
| Tensile strength, p.s.i. | 4,230 |
| Yield elongation, percent | 3 |
| Elongation at break, percent | 22 |
| Pendulum impact strength (ft.lbs./ft.$^3$) | 2.5 |
| Glass transition temperature, °C. | 50 |
| Flow temperature, °C. | 160 |

Example 3

Example 1 was repeated with the exception that the reaction time was 8 hours. The product polyvinyl butyral was obtained as a non-aqueous dispersion. This product had a composition consisting of 7 percent polyvinyl alcohol, 23.6 percent polyvinyl acetate, and 69.4 percent polyvinyl butyral. The physical properties of this product are shown in the table below:

TABLE III

| | |
|---|---|
| Modulus, p.s.i. | 189,000 |
| Yield strength, p.s.i. | 3,820 |
| Tensile strength, p.s.i. | 3,820 |
| Yield elongation, percent | 3 |
| Elongation at break, percent | 20 |
| Pendulum impact strength (ft. lbs./in.$^3$) | 2 |
| Glass transition temperature, °C. | 55 |
| Flow temperature, °C. | 160 |

Control B.—Example 1 was repeated with the exception that no 1,2-dimethoxy ethane was used in the charge. The polyvinyl butyral product thus obtained had a polyvinyl acetate content of 5.7 percent, polyvinyl alcohol content of 22.5 percent and a polyvinyl butyral content of 71.8 percent.

Example 4

Example 1 was repeated with the exception that 32 grams of 1,4-dioxane (5 percent of the total weight of the components) was substituted for the 1,2-dimethoxy ethane. A stable non-aqueous dispersion of polyvinyl butyral was obtained having comparable amounts of polyvinyl acetate, polyvinyl alcohol, and polyvinyl butyral moieties contained therein.

Examples 5–9

When Example 1 is repeated with the exception that 1,2-dimethoxy ethane is replaced by 1,2-diethoxy ethane, 1,2-dibutoxy ethane, 1,2-dimethoxypropane, tetrahydrofuran and tetrahydrothiophene similar results are obtained.

ANALYTICAL PROCEDURES (A) Determination of weight percent poly(vinyl acetate)

(A) 2.5 sample of dry resin is placed into a 500 ml. Erlenmeyer flask and to this is added 100 ml. of methanol. A reflux condenser is attached, and the mixture heated at reflux for 0.5 hr. The resulting heterogeneous mixture is cooled, phenophthalein added, and the mixture titrated to the end point with approximately 0.5 N methanolic KOH. An excess of 100 ml. of the KOH solution is added to the mixture which is then heated at reflux for 1½ hrs. The mixture is cooled to room temperature and titrated to the phenophthalein end point with standard 0.5 N HCl. A blank is prepared and determined simultaneously. The weight percent of poly(vinyl acetate) is determined by substitution in the following formula:

Wt. percent PVAC
$$= \frac{(V_{\text{acid for blank}} - V_{\text{acid for sample}}) \times N_{\text{acid}} \times 8.6}{\text{gms. of sample}}$$

V = volume in ml.

(B) Determination of weight percent poly(vinyl alcohol)

To 1.5 g. of resin in a 150 ml. Erlenmeyer flask is added 20 ml. of a solution prepared by mixing 30 ml. of acetic anhydride and 220 ml. of pyridine. The mixture is heated for ca. 2 hrs. on a steam bath, cooled, and 25 ml. of methylisobutyl ketone and 5 ml. of distilled water added. The resulting solution is heated on a steam bath for 0.5 hr. and cooled. Phenophthalein is added and the solution titrated to a pink end point with standard approximately .5 N alcoholic KOH. A blank is prepared and determined simultaneously. The weight percent of poly(vinyl alcohol) is determined by substitution in the following formula:

Wt. percent PVOH
$$= \frac{(V_{\text{KOH for blank}} - V_{\text{KOH for sample}}) \times N_{\text{KOH}} \times 4.4}{\text{gms. of sample}}$$

V = volume in ml.

(C) Determination of weight of polyvinyl acetal was made by difference from the values of polyvinyl acetate polyvinyl alcohol.

What is claimed is:
1. Method of preparing polyvinyl acetals having a vinyl ester contents of about 12 to 25% and a polyvinyl alcohol contents of about 7 to 10% which consists essentially of the steps of:
  (a) Heating with agitation at temperatures of about 0° C. to 150° C. for at least 5 minutes a mixture of:
    (1) a vinyl ester, having from 3 to 20 carbon atoms, and an inert hydrocarbon diluent, said vinyl ester being present in a concentration of about 5 to 85 percent by weight,
    (2) about 0.1 to 10 percent, based on the weight of said vinyl ester, of a polymeric organic interfacial agent selected from the group consisting of α-olefin/vinyl ester copolymers, vinyl acetate graft copolymerized onto ethylene/vinyl acetate copolymer, alkyl polyvinyl ethers, propylene oxide rubbers, or ethylene-propylene terpolymers, and
    (3) about 0.01 to 1 percent, based on the weight of said vinyl ester of a free radical polymerization initiator;
  (b) Recovering normally solid polyvinyl ester as a non-aqueous dispersion having a particle size of about 0.05 to 50 microns and an outer coating of polymeric organic interfacial agent;
  (c) Contacting said polyvinyl ester dispersion with:
    (1) about 0.8 to 1.5 moles, per mole of polyvinyl ester, of an aliphatic alcohol having from 1 to 6 carbon atoms,
    (2) about 0.35 to 0.75 mole, per mole of polymerized vinyl ester, of an aliphatic aldehyde having from about 1 to 6 carbon atoms,
    (3) a catalytic amount of an acid catalyst, and
    (4) about 2 to 8 percent, based on the total charge weight, of a swelling agent selected from the group consisting of alkylene glycol alkyl ethers having the formula ROR'OR wherein R is alkyl having 1 to 6 carbon atoms and R' is alkylene having 2 to 4 carbon atoms, diethylene glycol alkyl ethers having the formula

$$ROCH_2CH_2OCH_2CH_2OR$$

wherein R is as defined above, dioxane, tetrahydrofuran and tetrahydrothiophene; for at least 60 minutes at a temperature of about 25 to 150° C. and a pressure of about 0 to 200 p.s.i.g., and
  (d) Recovering said polyvinyl acetal dispersion.
2. Method claimed in claim 1 wherein the vinyl ester is vinyl acetate.
3. Method claimed in claim 2 wherein the aliphatic alcohol of step (c)(1) is methanol.
4. Method claimed in claim 3 wherein the aliphatic aldehyde of step (c)(2) is n-butyraldehyde.
5. Method claimed in claim 2 wherein the swelling agent is an alkylene glycol dialkyl ether.
6. Method claimed in claim 5 wherein the alkylene glycol dialkyl ether is 1,2-dimethoxy methane.
7. Method claimed in claim 2 wherein the swelling agent is a diethylene glycol alkyl ether.
8. Method claimed in claim 1 wherein the temperature in step (c)(4) is about 50 to 100° C.
9. Method claimed in claim 1 wherein the temperature in step (c)(4) is about 70 to 90° C.
10. Method claimed in claim 1 wherein the concentration of swelling agent is about 4 to 6 percent based on the weight of the total charge.

References Cited
UNITED STATES PATENTS

| | | | |
|---|---|---|---|
| 2,396,209 | 3/1946 | Sharkey | 260—73 L |
| 2,981,718 | 4/1961 | Heckmaier et al. | 260—73 L |
| 3,519,701 | 7/1970 | Pilato et al. | 260—874 |

HAROLD D. ANDERSON, Primary Examiner

L. M. PHYNES, Assistant Examiner

U.S. Cl. X.R.

260—73, 85.7, 91.3, 875, 876, 878, 879